United States Patent [19]

Chown

[11] 3,873,775

[45] Mar. 25, 1975

[54] METHOD AND AN ARRANGEMENT TO INDICATE DETERIORATION OF PCM TRANSMISSION QUALITY

[75] Inventor: Martin Chown, Harlow, England

[73] Assignee: International Standard Electric Corporation, New York, N.Y.

[22] Filed: Dec. 13, 1973

[21] Appl. No.: 426,789

[30] Foreign Application Priority Data

Jan. 25, 1973 United Kingdom ................ 3774/73

[52] U.S. Cl. ...... 179/15 BF, 178/71 T, 179/15 AD, 325/2

[51] Int. Cl. ............................................ H04j 3/14

[58] Field of Search .................. 179/15 BF, 15 AD; 178/71 T, 70 R; 325/2, 41, 42, 323, 473, 478; 328/164

[56] References Cited

UNITED STATES PATENTS 3,777,268 12/1973 Cledbury et al. ............. 179/15 AD

FOREIGN PATENTS OR APPLICATIONS 996,409 6/1965 United Kingdom ............ 325/38 A

*Primary Examiner*—David L. Stewart
*Attorney, Agent, or Firm*—John T. O'Halloran; Menotti J. Lombardi, Jr.; Alfred C. Hill

[57] ABSTRACT

This arrangement is connected to the input of a repeater and provides two auxiliary threshold levels, one on each side of the usual threshold level separating the two states of a binary PCM signal (the threshold level separating binary 1 and binary 0). The PCM signal amplitude is compared with the auxiliary threshold levels and the result of the comparison is sampled at the beginning of each PCM bit. If the PCM signal amplitude is between the auxiliary threshold levels at the instant of sampling, an output pulse is produced indicating a deterioration of the PCM transmission.

14 Claims, 2 Drawing Figures

METHOD AND AN ARRANGEMENT TO INDICATE DETERIORATION OF PCM TRANSMISSION QUALITY

BACKGROUND OF THE INVENTION

This invention relates to a method and apparatus for indicating deterioration of the quality of transmission of PCM (Pulse Code Modulation) signals.

It is particularly useful in PCM regenerators to indicate degradation or deterioration of the PCM signals without resorting to the complexities of error detection coding. Regenerators work by gating the signal to be regenerated at fixed timing instants (which may be defined by edges of clock pulses) thereby categorizing the signal into one of a finite number of predetermined levels. Provided the categorization and timing decisions are correct, the regenerated signal will not be degraded. Timing accuracy is fairly easy to achieve. Level determination is not so readily achieved, particularly when the incoming signal has been degraded to the point that the signal level is not clearly within one level or another.

SUMMARY OF THE INVENTION

An object of the present invention is the provision of a method and an arrangement to indicate when the quality of PCM transmission has deteriorated without employing error detection coding and the equipment that must be employed with error detection coding.

A feature of the present invention is to provide an arrangement to indicate deterioration of PCM signal transmission quality comprising an input for the PCM signal, first means to produce two auxiliary threshold levels one on either side of a boundary level separating two adjacent signal states of the PCM signal, second means coupled to the first means and the input to determine whether the PCM signal has an amplitude disposed between the two auxiliary threshold levels and to produce a first output signal when this occurs, and third means coupled to the second means to sample the output signal at timing instants corresponding to the beginning of each PCM pulse period to produce a second output signal indicating deterioration of the transmission quality.

Another feature of the present invention is to provide a method of indicating deterioration of PCM signal transmission quality comprising the steps of producing two auxiliary threshold levels one on either side of a boundary level separating two adjacent signal states of the PCM signal, determining when the PCM signal has an amplitude disposed between the two auxiliary threshold levels, and sampling the results of the determining step at instants corresponding to the beginning of each PCM pulse period, output pulses as the result of the sampling step indicating deterioration of the transmission quality.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENT

Figure 1:
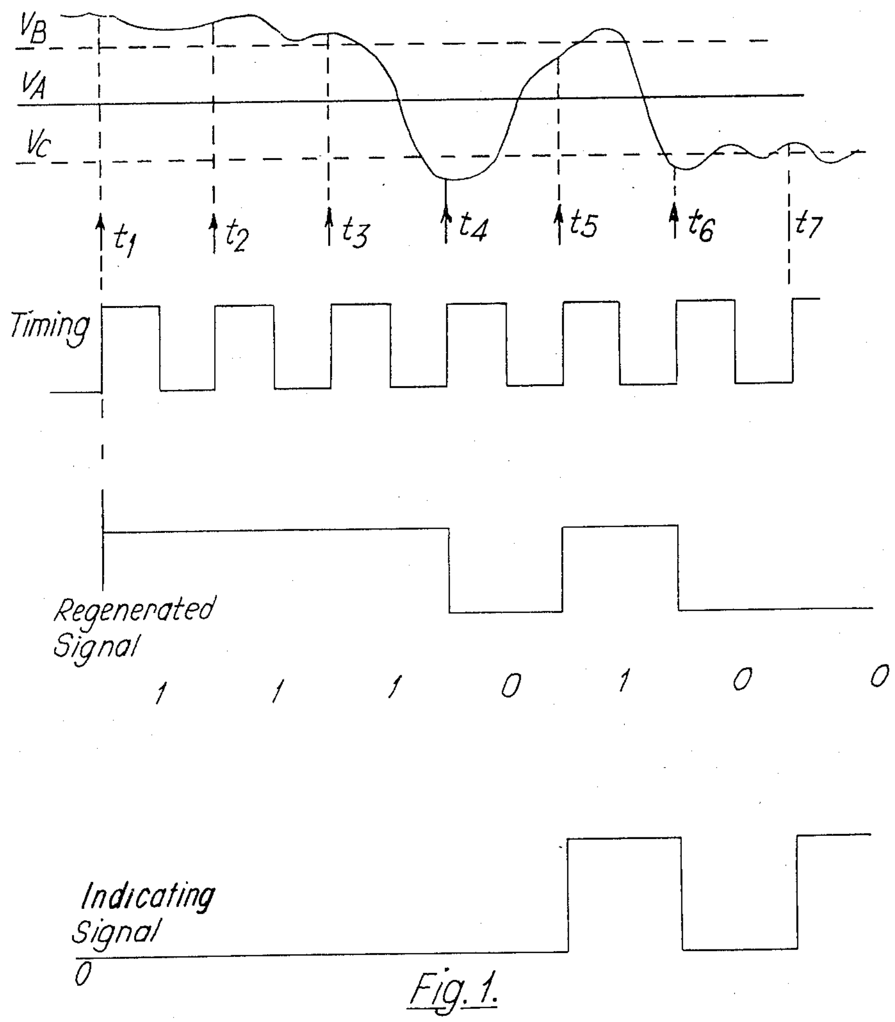
FIG. 1 depicts certain waveforms illustrating the principle of the present invention.

The most suitable place for determining the quality of a PCM transmission is at the input to a regenerator. Consider a binary (2-level) system in which the two levels are 1 (high) and 0 (low). These two levels are characterized, insofar as the line signals are concerned, by voltages which are above and below a threshold or boundary $V_A$, FIG. 1. At timing instants $t_1$, $t_2$ ... etc. a binary 1 is regenerated if the line voltage is above $V_A$, and a 0 is regenerated if it is below $V_A$.

An error occurs whenever the received signal is on the wrong side of the threshold at a timing instant, and this may arise from a number of causes including the following:

a. Loss of signal power.
b. Excessive noise.
c. Signal distortion.
d. Clock phase error.

Figure 2:
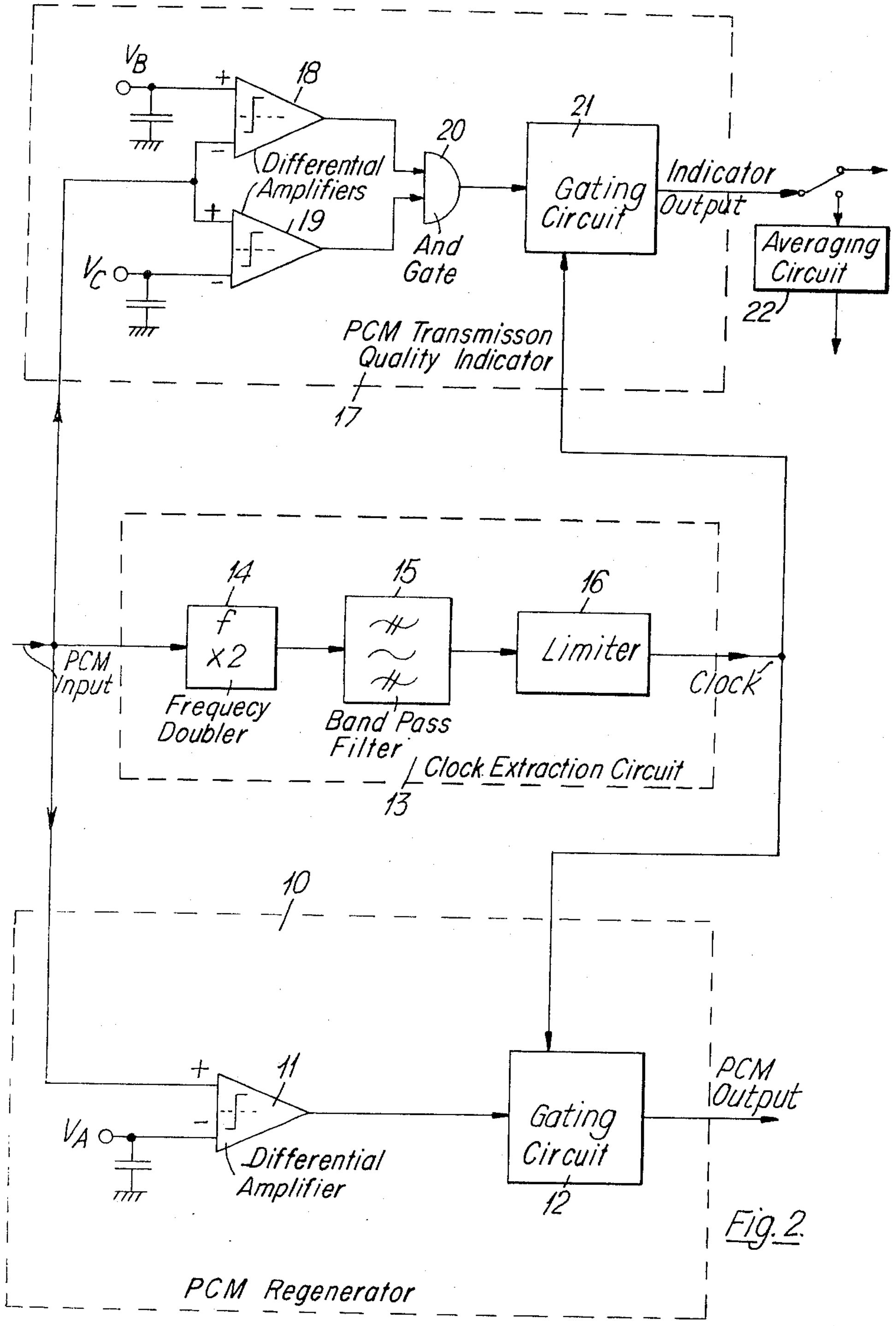
FIG. 2 illustrates an arrangement to indicate deterioration of PCM transmission quality in accordance with the principles of the present invention.

The arrangement shown in FIG. 2 will indicate signal degradation or deterioration. The incoming signal is fed to the PCM regenerator 10 comprising a differential amplifier 11 which acts as a level selector, the other input to the differential amplifier being the boundary voltage $V_A$. The output from differential amplifier 11 is applied to the gating circuit 12, which is under the control of the clock. The input signal is also fed to the clock extraction circuit 13, which comprises a frequency doubler 14 followed by a band-pass filter 15 and limiter 16. The output of limiter 16 is the clock frequency.

The PCM transmission quality indicator 17 also receives the input signal, which is applied to two comparators, constituted by differential amplifiers 18 and 19. Comparator 18 compares the input signal with an auxiliary threshold voltage $V_B$, and comparator 19 compares the input signal with auxiliary threshold $V_C$. Auxiliary threshold voltages $V_B$ and $V_C$ are disposed above and below threshold voltage $V_A$, respectively, and are close enough to voltage $V_A$ so any input signal lying between voltages $V_B$ and $V_C$ may be considered marginal. The principle is that when the input signal is in this marginal area the system is liable to error. The outputs of differential amplifiers 18 and 19 are fed to an AND gate 20 followed by a gating circuit 21 similar to the gating circuit 12 of the regenerator. Gating circuit 21 is also under the control of the clock. The output of the gating circuit 21 is thus a 1 pulse very time the input lies between voltages $V_B$ and $V_C$ at a timing or sampling instant.

With the system working well the input signal should never lie in the marginal area at the gating or sampling instants and no output should be delivered from indicator 17. However, if the system suffers from progressive degradation, indicator 17 will detect marginal operation of the system and can actuate an alarm by a 1 output from gating circuit 21, indicating that the system is probably approaching period of erroneous operation.

It may be that isolated faults would cause a signal to be delivered by indicator 17. To avoid unnecessary alarms the output of indicator 17 can be passed through an averaging circuit 22, the time constant of which is equal to several PCM bit periods.

To provide a more complex indicating system, it is possible to fix auxiliary threshold voltages $V_B$ and $V_C$ relative to threshold voltage $V_A$, where voltage $V_A$ is a slowly varying voltage (e.g., to accommodate a d.c. drift in the system). Alternatively, voltages $V_B$ and $V_C$ can be varied, e.g. according to a sawtooth waveform, and the corresponding variation of indicating signal will indicate how well the system is performing.

The invention is readily extended to *n*-level PCM systems, where *n* is greater than 2. In this case, there are *n*-1 boundaries between levels and the indicating system works by detecting received signals which fall within a predetermined area around each of these boundaries. For an *n*-level system there will be 2(*n*-1) auxiliary thresholds required.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to indicate deterioration of PCM signal transmission quality comprising:
- an input for said PCM signal;
- first means to produce two auxiliary threshold levels one on either side of a boundary level separating two adjacent signal states of said PCM signal;
- second means coupled to said first means and said input to determine whether said PCM signal has an amplitude disposed between said two auxiliary threshold levels and to produce a first output signal when this occurs;
- clock generating means coupled to said input to derive from only said signal states of said PCM signal a clock signal occurring at timing instants corresponding to the beginning of each PCM pulse period of said PCM signal; and
- third means coupled to said second means and said generating means, said third means responding to said clock signal to sample said first output signal at said timing instants to produce a second output signal indicating deterioration of said transmission quality.

2. An arrangement according to claim 1, wherein said second means includes
- a first differential amplifier having an output and two inputs, one of said two inputs being coupled to said input for said PCM signal to receive said PCM signal and the other of said two inputs being coupled to said first means to receive one of said two auxiliary threshold levels,
- a second differential amplifier having an output and two inputs, one of said two inputs being coupled to said input for said PCM signal to receive said PCM signal and the other of said two inputs being coupled to said first means to receive the other of said two auxiliary threshold levels, and
- an AND gate coupled to the output of both said first and second differential amplifiers to produce said first output signal.

3. An arrangement according to claim 2, wherein said first means produces said two auxiliary threshold levels at fixed values relative to the value of said boundary level.

4. An arrangement according to claim 2, wherein said first means produces said two auxiliary threshold levels having periodically varying values.

5. An arrangement according to claim 2, further including
- fourth means coupled to said third means to average said second output signal over a plurality of PCM pulse periods.

6. An arrangement according to claim 1, wherein said first means produces said two auxiliary threshold levels at fixed values relative to the value of said boundary level.

7. An arrangement according to claim 1, wherein said first means produces said two auxiliary threshold levels having periodically varying values.

8. An arrangement according to claim 1, further including
- fourth means coupled to said third means to average said second output signals over a plurality of PCM pulse periods.

9. A method of indicating deterioration of PCM signal transmission quality comprising the steps of:
- producing two auxiliary threshold levels one on either side of a boundary level separating two adjacent signal states of said PCM signal;
- determining when said PCM signal has an amplitude disposed between said two auxiliary threshold levels;
- deriving from only the signal states of said PCM signal a clock signal occurring at timing instants corresponding to the beginning of each PCM pulse period of said PCM signal; and
- sampling the results of said determining step by said clock signal at said timing instants, output pulses as the result of said sampling step indicating deterioration of said transmission quality.

10. A method according to claim 9, further including the step of
- averaging said output pulses over a number of PCM pulse periods.

11. A method according to claim 10, wherein said two auxiliary threshold levels are maintained at a fixed predetermined value with respect to the value of said boundary level.

12. A method according to claim 10, wherein said two auxiliary threshold levels have periodically varied values.

13. A method according to claim 9, wherein said two auxiliary threshold levels are maintained at a fixed predetermined value with respect to the value of said boundary level.

14. A method according to claim 9, wherein said two auxiliary threshold levels have periodically varied values.

* * * * *